United States Patent [19]
Haworth

[11] 3,799,698
[45] Mar. 26, 1974

[54] ROTORS FOR GAS TURBINE ENGINES
[75] Inventor: Lionel Haworth, Bristol, England
[73] Assignee: Secretary of State for Defence in Her Britannic Majesty's Government of the United Kingdom of Great Britain and Northern Ireland, London, England
[22] Filed: Nov. 29, 1971
[21] Appl. No.: 202,749

[30] Foreign Application Priority Data
Dec. 4, 1970   Great Britain.................. 57670/70

[52] U.S. Cl............................ 416/204, 416/244
[51] Int. Cl. ........................................ F01d 7/00
[58] Field of Search .......... 416/193, 204, 208, 214, 416/244, 219, 248

[56] References Cited
UNITED STATES PATENTS
2,939,536   6/1960   Kearns......................... 416/214 X
3,130,677   4/1964   Liebhart....................... 416/208 UX
3,545,885   12/1970  Killam.......................... 416/208 X
3,565,547   2/1971   Hansen......................... 416/204

FOREIGN PATENTS OR APPLICATIONS
202,263   2/1959   Austria............................ 416/244

Primary Examiner—Everette A. Powell, Jr.
Attorney, Agent, or Firm—Stevens, Davis, Miller & Mosher

[57] ABSTRACT

An annular rotor for supporting variable pitch blades of a fan for a gas turbine engine comprises two side walls which are of undulating shape so that at their radially outer ends they alternately meet and are spaced apart, thereby defining a plurality of circumferentially spaced apart rings, for supporting bearings on the roots of the fan blades.

6 Claims, 6 Drawing Figures

ROTORS FOR GAS TURBINE ENGINES

The present invention relates to rotors for gas turbine engines, and relates in particular to a rotor disc for supporting the blades of a variable pitch fan of such an engine.

According to the present invention there is provided an annular rotor for supporting a plurality of blades which are rotatable about their longitudinal axes, characterised in that the rotor has two spaced-apart annular side walls which are of undulating form so that at their radially outer ends they alternately meet and are spaced apart thereby defining a plurality of angularly spaced apart rings defining apertures for receiving bearings in which roots of the blades are to be supported, each side wall having at its radially inner end a radially extending annular disc, each disc being so positioned that the transverse plane which contains the centre of gravity of the half ring at the radially outer end of the respective side wall passes through the disc.

A transverse plane, in this connection, means a plane normal to the principal axis of the rotor.

The side walls have an undulating form which is most pronounced at the radially outer part of the rotor, the heights of the undulations diminishing as the radius of the rotor diminishes, until the side walls become planer and merge into the discs.

Thus the centrifugal loads produced on the rings in operation of the rotor, are transmitted to the discs through predominantly tensile loads in the side walls with minimum bending moments, and axial loads caused by the non-radial disposition of the side walls are substantially balanced in the rotor as a whole.

By making the rotor of the form described above, each bearing carrying a blade root is supported all the way round its circumference by a support which is of substantially uniform stiffness.

An axially extending cylindrical flange maybe provided on each side wall just radially outwardly of the point where the side walls meet the discs, in order to prevent transmission of non-radial loads to the discs.

The rotor may be made in twohalves which can be joined together along the transverse centre line, and with such a construction the inward projection of the inclination of each side wall in any axial section of the rotor may be made to pass through the centroid of the disc.

Also according to the invention there is provided a bladed rotor for a gas turbine engine comprising a plurality of angularly spaced apart rotor blades mounted for rotation about their longitudinal axes in a rotor by means of bearings at the roots of the blades, characterised in that the rotor has two spaced apart annular side walls which are of undulating form so that at their radially outer ends they alternately meet and are spaced apart thereby defining a plurality of angularly spaced apart rings defining apertures for receiving said bearings, each side wall having at its radially inner end a radially extending annular disc, and each disc being so positioned that the transverse plane which contains the centre of gravity of the respective side wall passes through the disc.

The rings may be radially outwardly extended to provide a greater depth of material into which the bearings are mounted.

An example of the invention will now be described in more detail, with reference to the accompanying drawings in which, FIG. 1 is a diagrammatic illustration of a gas turbine engine of the present invention.

Figure 1:
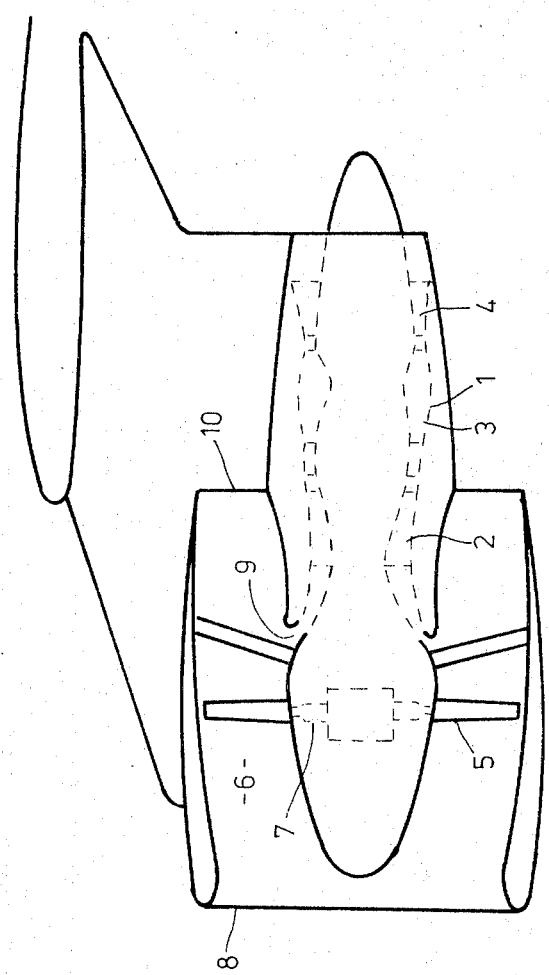
Figure 2:
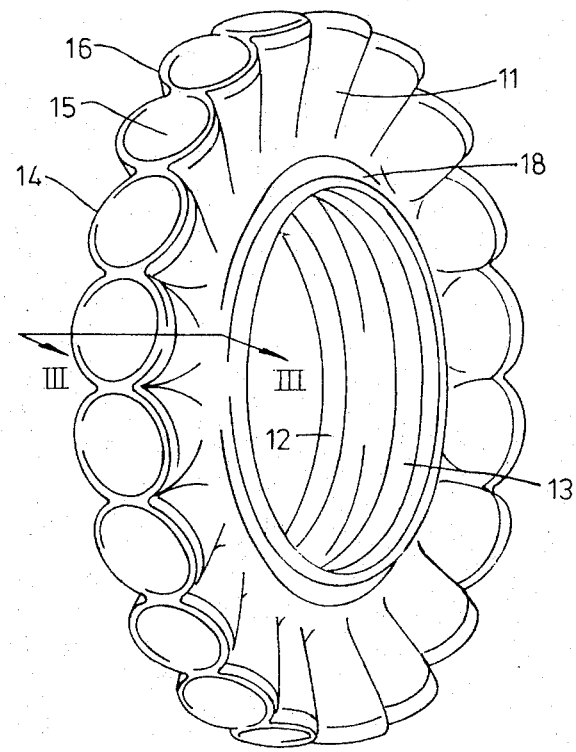
FIG. 2 is a pictorial view of the rotor of the fan of the engine of FIG. 1.

Referring now to the figures, in FIG. 1 there is illustrated a ducted fan gas turbine engine having a core engine, generally indicated by the numeral 1, which comprises compressor means 2, combustion equipment 3, and turbine means 4. The core engine is not described in detail since the type of core engine is not a relevant part of the present invention. The core engine produces hot gases which are used to drive a fan 5 which is disposed in a fan duct 6.

The fan blades are of variable pitch, i.e., they are mounted on a rotor in a manner such that they are rotatable about their longitudinal axes to vary their angle of attack. The rotation is performed by a pitch change mechanism 7 which may be of any suitable type and is not described in detail.

During normal operation of the engine the fan blades are turned to a forward thrust-producing pitch, and air flows through the fan duct rearwardly i.e., from an intake 8 to a nozzle 10. Part of this air flow is diverted into an inlet 9 of the core engine. The fan blades are rotatable to a reverse thrust-producing position in which air flows through the fan duct forwardly, i.e., from the nozzle 10 to the intake 8.

Referring now to FIGS. 2 to 5, there is shown an annular rotor on which the fan blades are mounted and which has two inclined side walls 10 and 11 which have radially extending discs, 12 and 13, at their radially inner ends.

At their radially outer ends the side walls alternately meet and are spaced apart to form a series of circumferentially spaced rings 14, the rings being dimensioned to define apertures 15 for receiving bearings which support the roots of blades in the assembled bladed rotor, the necks 16 between the rings being formed by the junction of the side walls.

The side walls are shaped to merge into the shape of the rings and to this end the side walls take on an undulating shape adjacent their radially outer ends so that they are alternately spaced apart by the diameter of an aperture 15, and joined together at a plurality of points 16.

Figure 3:
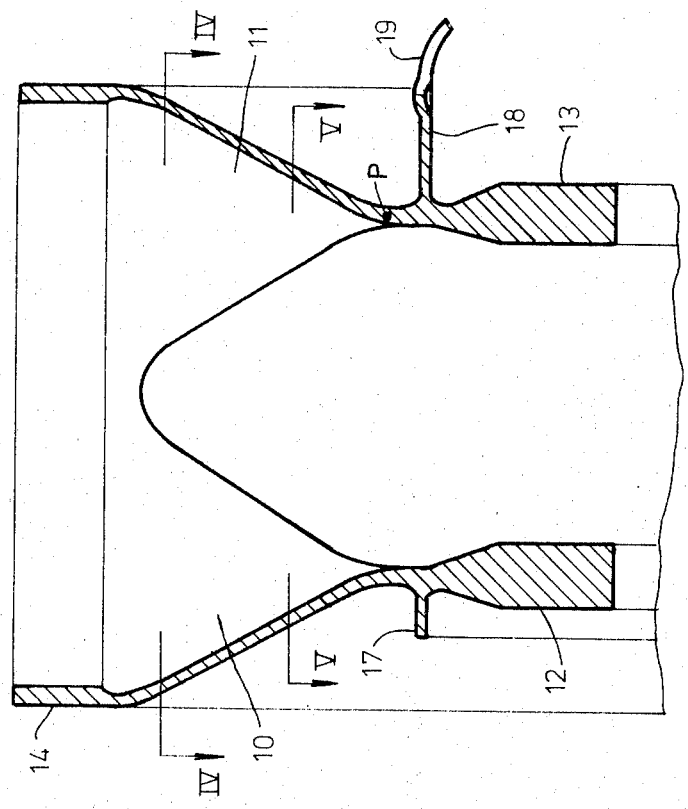
FIG. 3 is a section on the line III—III of FIG. 2.
Figure 5:
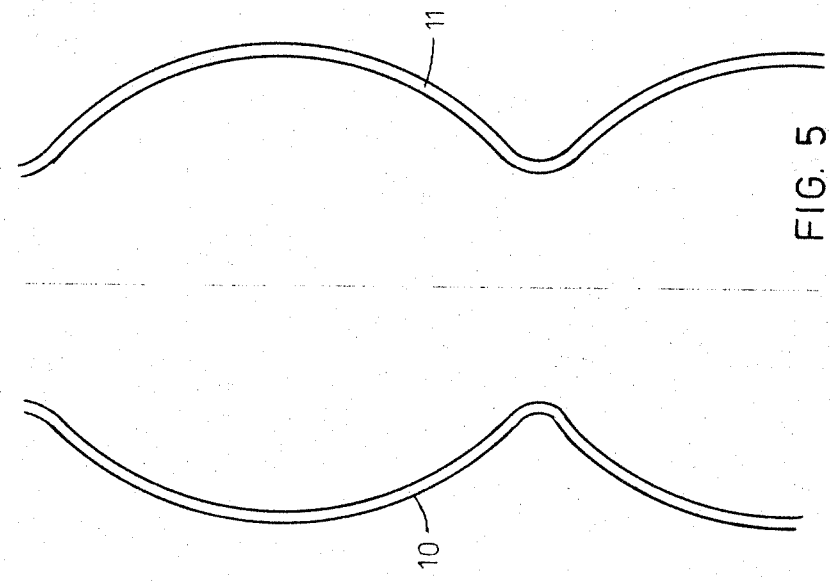
FIG. 5 is a section on the line V—V of FIG. 3.
Figure 4:
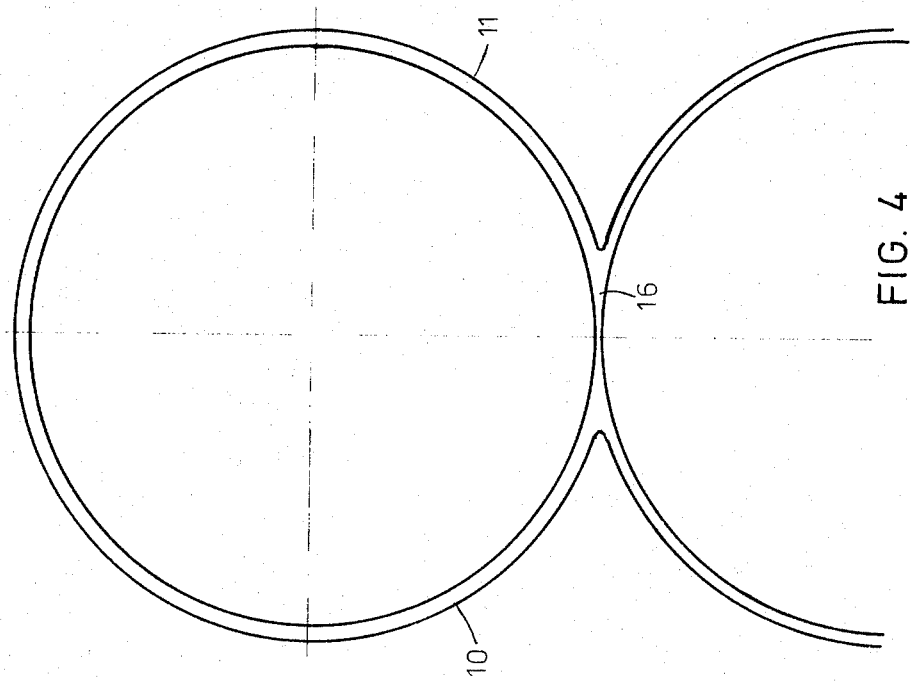
FIG. 4 is a section on the line IV—IV of FIG. 3.

FIGS. 4 and 5 show cross-sections through the side walls on the lines IV—IV and V—V of FIG. 3 to illustrate the changing magnitude of the undulations as the radius reduces, being a maximum at the radially outer ends of the side walls and zero just above the discs.

In FIG. 3 it can be seen that the side walls are inclined so as to be convergent on a circumferential line through a point P. The stresses in the side walls therefore have axial components which, at different points around the rotor, will have different magnitudes. Although, considering the rotor as a whole, all these axial components will balance, locally they will tend to pull the discs out of their plane form.

It is preferable from this point of view, therefore, to arrange that the angles of inclination of the side walls are such that the projections of the side walls inwardly converge on a circumferential line through the disc, preferably through the centroid of the disc, where the section of the disc is large enough for the disc to carry the load.

Where the rotor is made from a single piece, however, machining of the discs to achieve these preferred angles of inclination is difficult, and the problem can be overcome by providing axially extending circumferential flanges 17 and 18 adjacent the line P which can take the axial load components directly and avoids transmission of these components into the disc. The flange 18 is connected through a welded joint to a shaft 19 for driving the rotor, and the flange 17 is connected to a nose bullet (not shown).

The discs are positioned, by means of the radial inclination of the side walls, under the centre of gravity of the respective side walls on either side of a transverse plane through the centre line A—A of the rotor. Thus the radial loads due to centrifugal forces on the rotor in operation, are transmitted to the discs mainly by tensile loads in the side walls and bending forces are reduced.

In other examples, the radial planes containing the centres of gravity of the discs may not lie exactly under the centres of gravity of the respective side walls. The criterion for positioning the discs is to produce the optimum distribution of non-radial stresses in the rotor which may vary from one rotor design to another. In general it is anticipated that due to the width of the disc, a radial plane through the centre of gravity of the side wall on one side of the centre line A—A will pass through its respective disc.

In an alternative form the rotor may be made in two halves which are connectable together along the circumferential centre-line, by means of bolts for example. In such a construction the manufacture of the rotor is simplified and it is possible to arrange the angle of inclination of the side wall of any section of the rotor to be such that a projection of the side wall inwardly passes through the disc, at or near the centroid thereof. The axial components of the side wall loads are then taken in the disc at a point where the disc cross section is large enough to withstand the loads and the flanges 17 and 18 are not necessary for this purpose, although they may still be provided for the attachment of a nose bullet on the one side and a drive shaft on the other.

Figure 6:
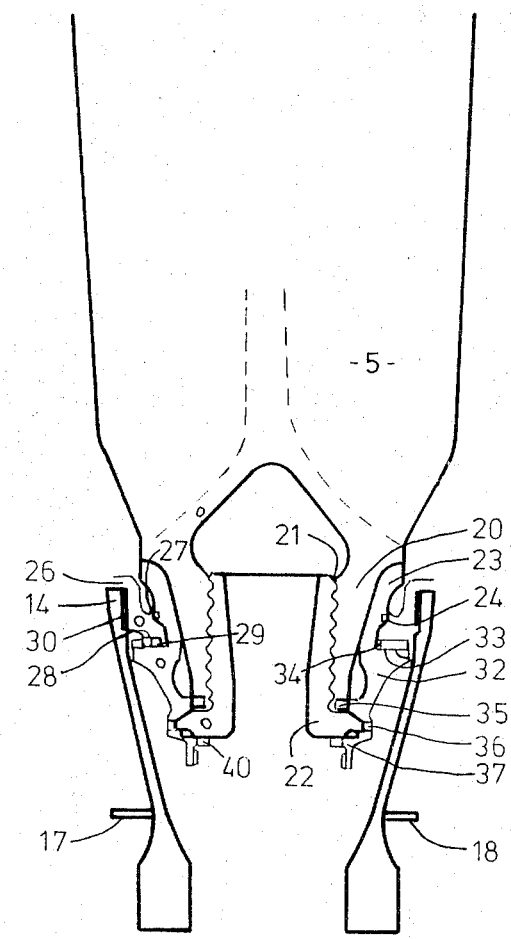
FIG. 6 is a section on the line III—III of FIG. 2, showing a blade in position.

FIG. 6 shows a section through the rotor with a blade in position. The particular arrangement shown in the figure is designed so that the blade, its bearings and its operating mechanism can all be assembled, outside the rotor, and can be inserted into an aperture from a position radially outwardly of the rotor and screwed into position.

The blade 5 has a root portion 20 which is provided with an internal thread 21. The thread 21 is adapted to be engaged with a corresponding thread on a bolt 22. Around the blade root is a spacer ring 23 which contains a cavity 24 for a seal (not shown). A nut 26 surrounds the spacer member and includes a surface 27 which co-operates with the seal to prevent leakage of fluid past the seal, a surface 28 which forms an outer race for a bearing 29, and a screw thread 30 for co-operation with a corresponding thread formed in one of the rings 14 of the rotor. A second spacer ring 32 surrounds the blade root and extends between the bolt 22 and the nut 26. This second ring includes a surface 33 which forms an inner race for the bearing 29, a surface 34 which abuts a corresponding surface on the spacer ring 23, a first set of dogs 35 for engaging corresponding dogs on the blade root portion 20, and a second set of dogs 36 for engaging a corresponding set of dogs on a locking ring 37.

In order to assemble the blade and the rotor, first the spacer ring 23, the nut 26, the seal 25, the bearing 29 and the spacer ring 32, are assembled around the blade root to form a sub-assembly. The bolt 22 is then screwed into threads 21 in the blade root and this bolts the sub-assembly together. The whole sub-assembly is then screwed into the rotor by means of nut 26.

The locking ring 37 is fitted and locks into the dogs 35 on the spacer ring 23 and into dogs 40 on the bolt, when the remaining part of the assembly (which includes drive from the pitch change mechanism, not shown) is fitted.

Alternative forms of this assembly can easily be contrived using the rotor of the present invention. For example, if the rotor is made in two halves, the assembly of the blades can be made more easily in the disc without having to design the blade root in a manner which enables a sub-assembly to be formed and screwed in from the outside. Thus the nut 26 may be dispensed with in such a rotor necessitating other minor changes in design.

In another alternative construction the rings may be extended radially to form a plurality of circumferentially spaced apart cylinders standing up from the rotor to receive the roots of the blades. By this means the forces on the blade roots due to centrifugal loads in the rotor tending to pull the apertures out of round can be reduced.

I Claim:

1. An annular rotor for supporting a plurality of blades which are rotatable about their longitudinal axes, and wherein the rotor has two spaced apart annular side walls which are of undulating form so that at one circumferential position they are radially outwardly convergent and at an adjacent circumferential position they are radially outwardly divergent and at their radially outer ends they alternately meet and are spaced apart thereby defining a plurality of angularly spaced apart rings defining apertures for receiving bearings in which roots of the blades are to be supported, each side wall having at its radially inner end an integral radially extending annular disc, each disc being so positioned that the transverse plane which contains the center of gravity of the half ring lies between the most convergent and divergent positions of said side wall and passes through the disc.

2. A rotor as claimed in claim 1 and wherein the undulations of the side walls are greatest at the radially outer periphery of the rotor, and diminish as the radius decreases to zero adjacent the discs.

3. A rotor as claimed in claim 1 and wherein the rotor is made in two halves joined along a center line in a transverse plane.

4. An annular rotor for supporting a plurality of blades which are rotatable about their longitudinal axes, and wherein the rotor has two spaced apart annular side walls which are of undulating form so that at one circumferential position they are radially outwardly convergent and at an adjacent circumferential position they are radially outwardly divergent and at their radially outer ends they alternately meet and are spaced apart thereby defining a plurality of angularly spaced apart rings defining apertures for receiving bearings in which roots of the blades are to be supported, each side wall having at its radially inner end a radially extending annular disc, each disc being so positioned that the transverse plane which contains the center of gravity of the half ring at the radially outer end of the respective side wall passes through the disc, wherein an axially extending flange is provided on each side wall above the discs to prevent the transmission of non-radial loads into the discs.

5. A rotor as claimed in claim 1 and wherein the rings are extended radially to form a plurality of angularly spaced apart cylinders standing up from the rotor.

6. A bladed rotor for a gas turbine engine comprising a plurality of angularly spaced apart rotor blades mounted for rotation about their longitudinal axes in a rotor by means of bearings at the roots of the blades and wherein the rotor has two spaced apart annular side walls which are of undulating form so that at one circumferential position they are radially outwardly convergent and at an adjacent circumferential position they are radially outwardly divergent and at their radially outer ends they alternately meet and are spaced apart thereby defining a plurality of angularly spaced apart rings defining apertures for receiving bearings in which the roots of the blades are supported, each side wall having at its radially inner end an integral radially extending annular disc, each disc being so positioned that the transverse plane which contains the resultant of the radial loads on the half bearing supported by the respective side wall passes through the disc.

* * * * *